US012807114B2

(12) United States Patent
Yoo

(10) Patent No.: US 12,807,114 B2
(45) Date of Patent: Nov. 24, 2026

(54) BRAKING SYSTEM AND METHOD FOR VEHICLE

(71) Applicant: HYUNDAI MOBIS CO., LTD., Seoul (KR)

(72) Inventor: Ji Ho Yoo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 10 days.

(21) Appl. No.: 19/029,812

(22) Filed: Jan. 17, 2025

(65) Prior Publication Data

US 2025/0340194 A1 Nov. 6, 2025

(30) Foreign Application Priority Data

May 2, 2024 (KR) ........................ 10-2024-0058509

(51) Int. Cl.
*B60T 13/74* (2006.01)
*B60T 17/22* (2006.01)

(52) U.S. Cl.
CPC .......... *B60T 13/745* (2013.01); *B60T 17/221* (2013.01)

(58) Field of Classification Search
CPC .... B60T 13/745; B60T 17/221; B60T 13/662; B60T 13/686; B60T 13/142; B60T 2210/30; B60Y 2400/81
See application file for complete search history.

(56) References Cited

U.S. PATENT DOCUMENTS

2013/0001027 A1* 1/2013 Baehrle-Miller ....... F16D 65/18 188/106 F
2015/0158471 A1* 6/2015 Ezoe ......................... B60T 7/22 701/70
2017/0072932 A1* 3/2017 Steward .................. B60T 17/22
2018/0304870 A1* 10/2018 Ninoyu ................... B60T 7/042
2018/0306172 A1* 10/2018 Kuenkel ................. F04B 1/053

FOREIGN PATENT DOCUMENTS

KR 10-2022-0010679 A 1/2022

* cited by examiner

*Primary Examiner* — Joseph J Dallo
(74) *Attorney, Agent, or Firm* — Morgan, Lewis & Bockius LLP

(57) ABSTRACT

A braking system for a vehicle according to an aspect of the present disclosure includes a processor and memory that stores at least one instruction executed by the processor. The processor compares an outside temperature of the vehicle with a preset reference outside temperature and controls brake fluid of the vehicle to circulate through a hydraulic circuit of the braking system based on the comparison results, so that a temperature difference between a front end and rear end of the braking system is reduced.

10 Claims, 4 Drawing Sheets

FIG.4

| Temperature [degC] | Kinematic Viscosity [Relative Value] |
|---|---|
| -40 | 1.00000 |
| -30 | 0.36190 |
| -20 | 0.13333 |
| -10 | 0.07619 |
| 0 | 0.04190 |
| 10 | 0.02571 |
| 20 | 0.01667 |
| 30 | 0.01143 |
| 40 | 0.00833 |
| 50 | 0.00643 |
| 60 | 0.00500 |
| 70 | 0.00400 |
| 80 | 0.00333 |
| 90 | 0.00276 |
| 100 | 0.00238 |

BRAKING SYSTEM AND METHOD FOR VEHICLE

CROSS-REFERENCE TO RELATED APPLICATION

This application claims priority from and the benefit of Korean Patent Application No. 10-2024-0058509, filed on May 2, 2024, which is hereby incorporated by reference for all purposes as if set forth herein.

BACKGROUND

Field

Exemplary embodiments of the present disclosure relate to a braking system and method for a vehicle.

Discussion of the Background

An electronic braking system, one of the braking systems for a vehicle, performs braking by detecting the force generated when a driver presses the brake pedal, which is transmitted as an electrical signal by a pedal displacement sensor, and transmitting the force to components such as wheel cylinders or calipers through the pressure of an incompressible liquid, namely brake fluid.

Such an electronic braking system typically includes components such as cylinders, actuators (e.g., motors), devices that convert the rotational motion of a motor into the forward movement of a piston, hydraulic systems including a master cylinder and a solenoid valve, and a hydraulic pressure supply device, all interconnected through a hydraulic circuit. To achieve the required braking force at the caliper cylinders of each wheel through the hydraulic circuit, the temperature of brake fluid and each component is a crucial factor.

The brake fluid, which serves to transmit the pressure generated by pedal input to the calipers through the hydraulic circuit, increases in viscosity as the temperature decreases. This increase in viscosity may lead to reduced braking responsiveness. Due to these temperature-induced changes in the properties of brake fluid, issues with vehicle control stability may arise. For example, when a vehicle is left exposed to extreme cold for an extended period, the brake fluid near a motor and a valve at the front end of the braking system increases in temperature due to the thermal energy generated by the operation of the motor and valve. In contrast, the brake fluid near the calipers and wheel cylinders at the rear end of the braking system remains at a low temperature due to the outside temperature. A temperature difference between the front end and rear end of the braking system may in turn lead to a difference in responsiveness between the front end and rear end of the braking system, potentially causing fluctuations in brake fluid pressure depending on the control method. Maintaining a uniform temperature of brake fluid in the braking system is thus a crucial factor directly linked to the responsiveness and stability of the braking system.

Conventional techniques are configured with control parameters to reduce responsiveness by measuring temperature from a pressure sensor within the braking system to overcome this difference in responsiveness. However, even with the reduction of control parameters, pressure fluctuations still occur when a large difference exists between outside and inside temperatures. There is still a lack of techniques to achieve a stable braking system that responds to the outside temperature.

The related art of the present disclosure is disclosed in Korean Patent Application Publication No. 10-2022-0010679 (published on Jan. 26, 2022).

SUMMARY

Exemplary embodiments according to an aspect of the present disclosure are directed to providing a braking system and method for a vehicle, which achieve stable braking for a vehicle by driving a motor and a valve to increase the temperature of the braking system and brake fluid to a level that enables a stable control of the braking system, and by circulating brake fluid multiple times when an outside temperature of the vehicle is a reference temperature or lower.

A braking system for a vehicle according to an aspect of the present disclosure includes a processor and memory that stores at least one instruction executed by the processor. The processor compares an outside temperature of the vehicle with a preset reference outside temperature and controls brake fluid of the vehicle to circulate through a hydraulic circuit of the braking system based on the comparison results, so that a temperature difference between a front end and rear end of the braking system is reduced.

In an embodiment, the processor controls brake fluid of the vehicle to circulate through the hydraulic circuit of the braking system by performing a pumping process that moves a piston of a main master cylinder back and forth to a preset displacement.

In the embodiment, the processor controls brake fluid to circulate through the hydraulic circuit, monitors the temperature difference between the front end and rear end of the braking system, and counts the number of brake fluid circulations.

In the embodiment, the processor terminates brake fluid circulation when the number of brake fluid circulations reaches a preset minimum number of circulations.

In the embodiment, the processor terminates brake fluid circulation when the temperature difference between the front end and rear end of the braking system meets a preset reference value.

A braking method for a vehicle according to an aspect of the present disclosure includes: receiving, by a processor, an outside temperature of the vehicle; controlling, by the processor, brake fluid of the vehicle to circulate through a hydraulic circuit of a braking system when the outside temperature of the vehicle is a preset reference outside temperature or lower; receiving, by the processor, a temperature of the braking system; and terminating, by the processor, brake fluid circulation when the number of brake fluid circulations reaches a preset minimum number of circulations or a temperature difference between a front end and rear end of the braking system meets a preset reference value.

In an embodiment, in the controlling, the processor controls brake fluid of the vehicle to circulate through the hydraulic circuit of the braking system by performing a pumping process that moves a piston of a main master cylinder back and forth to a preset displacement.

In the embodiment, in the controlling, the processor controls brake fluid to circulate through the hydraulic circuit, monitors the temperature difference between the front end and rear end of the braking system, and counts the number of brake fluid circulations.

In the embodiment, in the terminating, the preset minimum number of circulations is calculated based on a pumping discharge amount relative to the total volume of brake fluid.

In the embodiment, in the terminating, the processor adds an additional circulation of brake fluid when the number of brake fluid circulations does not reach the preset minimum number of circulations or the temperature difference between the front end and rear end of the braking system does not meet the preset reference value.

With the braking system and method for a vehicle according to an aspect of the present disclosure, multiple circulations of brake fluid through the hydraulic circuit may reduce the temperature difference of brake fluid between the front end and rear end of the braking system in low-temperature environments, such as extreme cold, and facilitate smooth circulation of the brake fluid within the braking system, thereby not only improving the responsiveness of the braking system for a vehicle but also achieving a stable braking system for a vehicle.

BRIEF DESCRIPTION OF THE DRAWINGS

FIG. 4 is a table showing the change in viscosity of brake fluid based on the outside temperature in a braking method for a vehicle according to an embodiment of the present disclosure.

DETAILED DESCRIPTION OF THE ILLUSTRATED EMBODIMENTS

Figure 1:
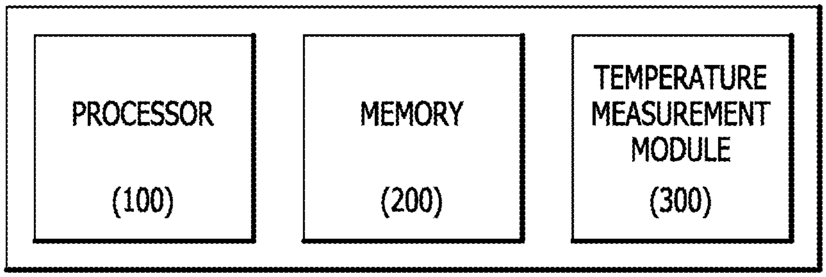
FIG. 1 is a block diagram illustrating a braking system for a vehicle according to an embodiment of the present disclosure.

Embodiments of a braking system and method for a vehicle according to the present disclosure will be described hereinafter with reference to the accompanying drawings. In this process, the thickness of lines and the size of elements illustrated in the drawing may be exaggerated for clarity and convenience of description. In addition, the terms used below are defined in consideration of the functions thereof in the present disclosure and may vary depending on the intention of a user or an operator or common practice. Therefore, these terms should be contextually defined in light of the present specification.

In describing the present disclosure throughout the specification, the terms "electrically connected," "connected," and "coupled" between individual components are intended to include not only direct connections but also connections made through an intermediate medium while maintaining certain properties to a reasonable extent. The terms "transmitted," "output," and similar expressions referring to individual signals are also intended to include not only their direct meanings but also indirect meanings where the signal is transmitted or output through an intermediate medium while maintaining properties to a reasonable extent. The terms "imposed," "applied," and "input" with respect to voltage or signals are also used throughout the specification with the same meaning. In addition, the terms used below are defined in consideration of the functions thereof in the present disclosure and may vary depending on the intention of a user or an operator or common practice. Therefore, these terms should be contextually defined in light of the present specification.

FIG. 1 is a block diagram illustrating a braking system for a vehicle according to an embodiment of the present disclosure.

Referring to FIG. 1, a braking system for a vehicle according to an embodiment of the present disclosure may include a processor 100, memory 200, and a temperature measurement module 300.

The processor 100 may be connected to the temperature measurement module 300 and function as a device that monitors an outside temperature ($T_o$) of the vehicle and a temperature difference ($T_B$) between the front end and rear end of the braking system.

In the embodiment, the processor 100 may be an entity that controls brake fluid circulation using temperature measurement results from the temperature measurement module 300, be implemented as a central processing unit or system on chip (SoC), run an operating system or application to control a plurality of hardware or software components connected to the processor 100, and perform various data processing and computations. The processor 100 may be configured to execute at least one instruction stored in the memory 200 and save the resulting data in the memory 200.

Specifically, the memory 200 may store the outside temperature of the vehicle ($T_o$) measured by the temperature measurement module 300 and the number of brake fluid circulations.

The memory 200 may store an algorithm for comparing the outside temperature of the vehicle ($T_o$) with a preset reference outside temperature ($T_{th1}$), and an algorithm for determining whether to circulate the brake fluid accordingly.

In addition, the memory 200 may store at least one of the following algorithms: an algorithm for calculating the minimum number of brake fluid circulations, an algorithm for counting the current number of brake fluid circulations, and an algorithm for determining whether to recirculate brake fluid based on the temperature difference ($T_B$) between the front end and rear end of the braking system. These algorithms may be stored in a form of instructions executable by the processor 100.

The memory 200 may include random access memory (RAM), non-volatile memory such as read-only memory (ROM), electrically erasable programmable ROM (EEPROM), flash memory, and storage devices like HDDs, SDDs, and SSDs. In some embodiments, the memory where data is stored and the memory where instructions (algorithms) are stored may be implemented as physically and/or logically separate configurations.

The temperature measurement module 300 may be configured to measure the outside temperature of the vehicle ($T_o$) and the temperatures at the front end and rear end of the braking system.

The temperature measurement module 300 may include a first temperature sensor (not shown) for measuring the outside temperature of the vehicle ($T_o$), a second temperature sensor (not shown) for measuring the temperature at the front end of the braking system, and a third temperature sensor (not shown) for measuring the temperature at the rear end of the braking system. Each temperature sensor may be installed at a preset location on the vehicle within the range capable of measuring the outside temperature of the vehicle ($T_o$), and the temperatures at the front end and rear end of the braking system. The temperature measurement module 300 may be implemented as a known temperature sensor that measures the temperature inside and outside the vehicle, so a detailed description is omitted.

Figure 2:
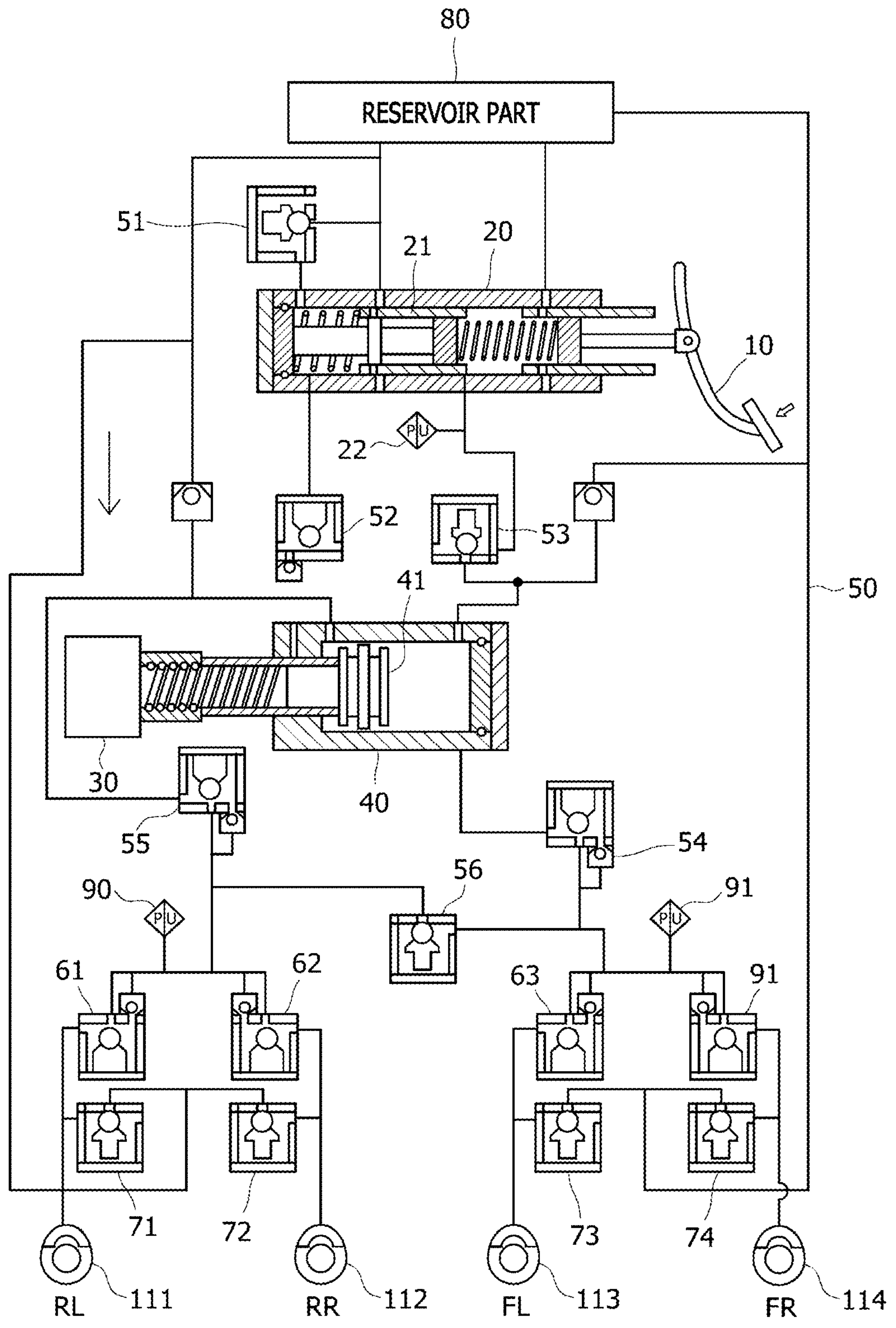
FIG. 2 is a hydraulic circuit diagram illustrating a braking system for a vehicle according to an embodiment of the present disclosure.

FIG. 2 is a hydraulic circuit diagram illustrating a braking system for a vehicle according to an embodiment of the present disclosure.

Referring to FIG. 2, a braking system for a vehicle according to an embodiment of the present disclosure may be configured as a braking system that includes: a brake pedal 10, a pedal cylinder 20, a pedal simulator 21 for creating the pedal feel for a driver, a pedal cylinder pressure sensor 22, an actuator 30 composed of a motor for controlling the hydraulic pressure of a main master cylinder and a rotation-linear motion conversion mechanism (e.g., a ball screw and a screw guide) for converting the rotational motion of the motor into linear motion, a main master cylinder 40, a main master piston 41, a hydraulic circuit 50, hydraulic control valves 51, 52, 53, 54, 55, 56 for controlling the hydraulic pressure of the hydraulic circuit, inlet valves 61, 62, 63, 64 for controlling the brake fluid supplied to wheel cylinders, outlet valves 71, 72, 73, 74 for controlling the brake fluid discharged from the wheel cylinders, a reservoir part 80 connected to the pedal cylinder 20 for storing brake fluid, pressure sensors 90, 91, and wheel cylinders 111, 112, 113, 114.

As used herein, the front end of the braking system is defined as including the actuator 30, the main master cylinder 40, and the main master piston 41, and the rear end of the braking system is defined as including the inlet valves 61 to 64, the outlet valves 71 to 74, and the wheel cylinders 111 to 114.

Based on the above-mentioned description, the configuration of the embodiment will be described in detail below with reference to FIG. 3, focusing on a braking method for a vehicle by a processor 100.

Figure 3:
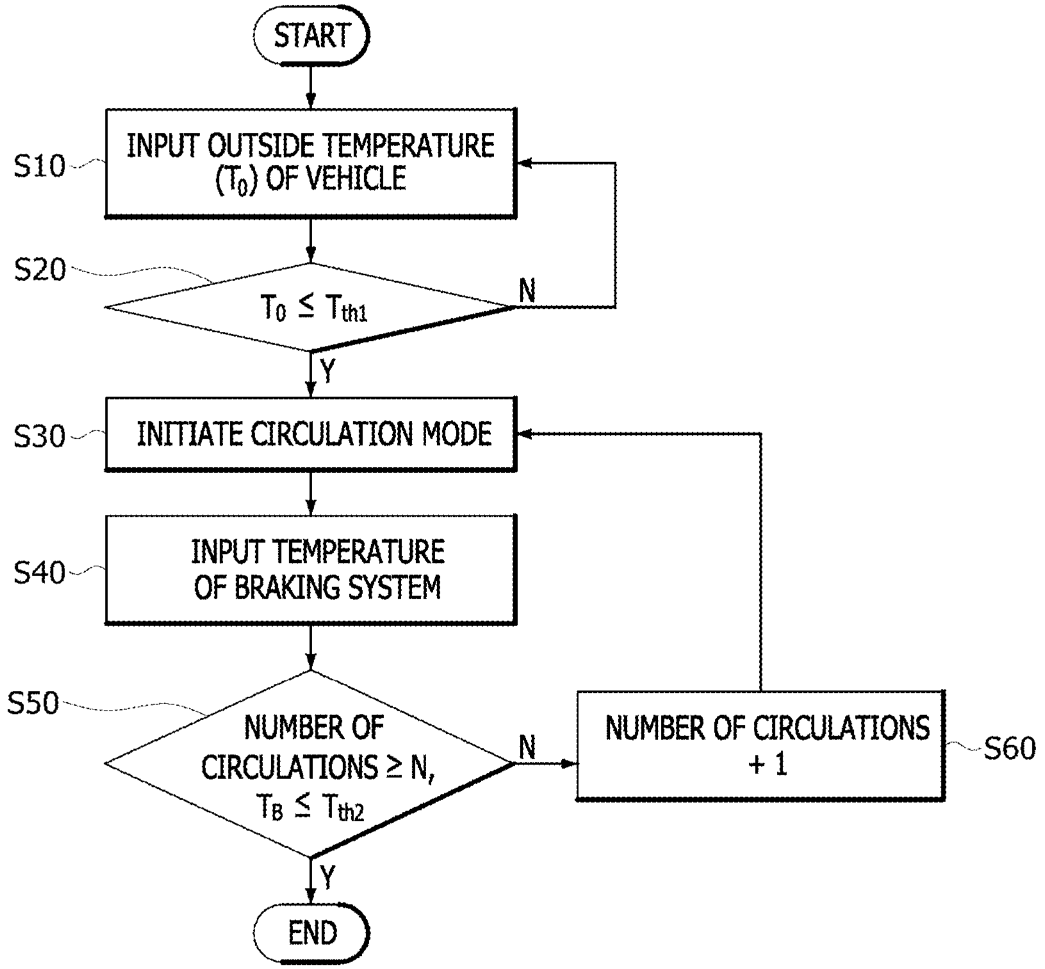
FIG. 3 is a flowchart illustrating a braking method for a vehicle according to an embodiment of the present disclosure.

FIG. 3 is a flowchart illustrating a braking method for a vehicle according to an embodiment of the present disclosure.

First, the processor 100 may receive an outside temperature of the vehicle ($T_o$) from a temperature measurement module 300 (S10). At step S10, the processor 100 may determine the status of a braking system based on the outside temperature of the vehicle ($T_o$) received when the vehicle is started.

Next, the processor 100 may compare the outside temperature of the vehicle ($T_o$) with a preset reference outside temperature ($T_{th1}$) (S20).

The reference outside temperature ($T_{th1}$) may be predefined based on experimental results (e.g., −10° C.) and be set differently depending on the vehicle model and environment, and is not limited to this value. The processor 100 does not perform a circulation mode when the outside temperature of the vehicle ($T_o$) exceeds the reference outside temperature ($T_{th1}$). In this case, an embodiment may be provided in which the processor 100 waits to initiate the circulation mode by continuously monitoring the temperatures at the front end and rear end of the braking system through the temperature measurement module 300 to ascertain the responsiveness of the braking system, even if the processor 100 does not initiate the circulation mode.

When the outside temperature of the vehicle ($T_o$) is determined to be the reference outside temperature ($T_{th1}$) or lower at step S20, the processor 100 may initiate the circulation mode that controls the vehicle's brake fluid to circulate through a hydraulic circuit of the braking system (S30).

Vehicles in which the circulation mode is initiated by the processor 100 may have a brake-by-wire (BBW) system (e.g., IMEB) capable of circulating brake fluid.

The hydraulic circuit circulation of brake fluid controlled by the processor 100 is initiated when a main master piston 41 of a main master cylinder 40 performs one pumping process by moving back and forth. As a result, brake fluid may circulate through the braking system via a hydraulic circuit 50.

Generally describing a brake fluid circulation mode by the processor 100, when a driver applies force to a brake pedal 10, hydraulic pressure is generated in a pedal cylinder 20. The generated hydraulic pressure is then supplied to a piston of a pedal simulator 21 to pressurize an elastic body of the pedal simulator 21. The reaction force from the pressurized elastic body may create the pedal feel for the driver. An actuator 30 operates to generate braking hydraulic pressure based on the signal output from a pedal cylinder pressure sensor 22 as the brake pedal 10 is pressurized. The main master cylinder 40 may generate braking hydraulic pressure through the piston 41, which moves back and forth by the actuator 30. The braking hydraulic pressure generated in the main master cylinder 40 may be transmitted to each wheel cylinder 111 to 114 through hydraulic control valves 54, 55, 56, inlet valves 61 to 64, and outlet valves 71 to 74. Through the circulation mode controlled by the processor 100, brake fluid may circulate through a hydraulic circuit 50 from a reservoir part 80 to wheel cylinders 111 to 114, which perform braking for each wheel RR, RL, FR, FL.

The minimum number of circulations (N) for the processor 100 to circulate brake fluid at step S30 may be the minimum number of circulations of brake fluid required to eliminate the temperature difference between the front end and rear end of the braking system, and calculated and determined based on the amount of a single pumping discharge relative to the total volume of brake fluid. For example, when a vehicle has a total brake fluid volume of 800 cc and a single pumping discharge amount of 20 cc, the initial circulation may require 40 cycles. The minimum number of circulations (N) may be determined experimentally and vary depending on the vehicle model, allowing for adjustment. Therefore, it is not limited to the values described above.

As the circulation mode is initiated by the processor 100, the temperature of the braking system rises. As brake fluid is circulated multiple times, the heat generated at the front end of the braking system, including the actuator 30, main master cylinder 40, and main master piston 41, is transmitted to the rear end of the braking system, including the wheel cylinders 111 to 114. This enables the circulation of brake fluid at a uniform temperature throughout the entire braking system.

Also, at step S30, the processor 100 may count the number of brake fluid circulations and store the resulting value in memory 200. The counting of the number of circulations may be performed by detecting the movement or displacement of the main master piston 41 through a separate counting module (not shown) or a displacement sensor (not shown). The counting module or displacement sensor according to an embodiment of the present disclosure may be configured to be electrically connected to the main master cylinder 40 and the main master piston 41.

Next, the processor 100 may receive the temperature of the braking system (S40).

At step S40, the processor 100 may receive the temperature of the braking system, specifically the temperatures at the front end and rear end of the braking system, through the temperature measurement module 300, and ascertain the temperature difference between the front end and rear end of the braking system after the circulation mode is performed.

The processor 100 may then determine whether the number of brake fluid circulations reaches a preset minimum number of circulations (N) or whether the temperature difference ($T_B$) between the front end and rear end of the braking system is a preset reference value ($T_{th2}$) or less and terminate the circulation mode (S50).

The processor 100 may receive the number of brake fluid circulations from the counting module and determine whether the number of initial circulations of brake fluid reaches the minimum number of circulations (N). In addition, the processor 100 may determine whether the temperature difference ($T_B$) between the front end and rear end of the braking system, as input at step S40, is a preset reference value ($T_{th2}$) or less.

The processor 100 may terminate the circulation mode only when the number of brake fluid circulations or the temperature difference ($T_B$) between the front end and rear end of the braking system meets the termination requirements.

Next, when the number of brake fluid circulations does not reach the preset minimum number of circulations (N) and the temperature difference ($T_B$) between the front end and rear end of the braking system exceeds the preset reference value ($T_{th2}$), the processor 100 may add an additional circulation of brake fluid (S60).

The processor 100 may determine whether to terminate the circulation mode based on the number of brake fluid circulations and the temperature difference ($T_B$) between the front end and rear end of the braking system, and resume the circulation mode to recirculate brake fluid when the requirements for terminating the circulation mode are not met. The additional brake fluid circulation at step S60 may be at least one cycle, but this count may be determined experimentally or vary depending on the vehicle model, and thus is not limited to this value.

The above embodiment has been described on the basis of terminating the brake fluid circulation mode in the braking method for a vehicle when either the number of brake fluid circulations or the temperature difference ($T_B$) between the front end and rear end of the braking system meets a reference. However, another embodiment of the present disclosure may be provided where, in the step of terminating the brake fluid circulation mode, the circulation mode is terminated only when both the number of brake fluid circulations and the temperature difference ($T_B$) between the front end and rear end of the braking system meet the termination requirements.

For example, the processor 100 may resume the circulation mode to add an additional brake fluid circulation to reduce the temperature difference between the front end and rear end of the braking system when the input temperature difference ($T_B$) between the front end and rear end of the braking system exceeds a preset reference value ($T_{th2}$), even though the number of brake fluid circulations exceeds the minimum number of circulations (N).

Similarly, the processor 100 may also add an additional brake fluid circulation to ensure the stability of the braking system when the input temperature difference ($T_B$) between the front end and rear end of the braking system is the preset reference value ($T_{th2}$) or less, but the number of brake fluid circulations does not reach the minimum number of circulations (N). Since a detailed description of each step, other than the step of terminating in the braking method for a vehicle according to an embodiment of the present disclosure, has been provided above, redundant descriptions are omitted.

FIG. 4 is a table showing the change in the kinematic viscosity of brake fluid based on the outside temperature in the braking method for a vehicle according to an embodiment of the present disclosure. The viscosity at −40° C. is used as the reference value of 1, and the viscosity at other temperatures is indicated relatively.

Referring to FIG. 4, it may be seen that the kinematic viscosity of brake fluid increases in an exponential manner as the temperature decreases, specifically when the outside temperature of the vehicle falls below zero. A braking system and method for a vehicle according to an embodiment of the present disclosure may include an embodiment where, for example, when the outside temperature of the vehicle is −10° C. or lower, the brake fluid circulation mode is forcibly performed to increase the temperature of the braking system to 10° C. and circulate brake fluid, thereby reducing the temperature difference between the front end and rear end of the braking system.

By following this embodiment, multiple circulations of brake fluid may reduce the temperature difference of brake fluid between the front end and rear end of the braking system in low-temperature environments, such as extreme cold, and facilitate smooth circulation of brake fluid within the braking system, thereby providing techniques that not only improve the responsiveness of the braking system for a vehicle but also achieve a stable braking system for a vehicle.

As used herein, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC). Furthermore, an implementation described in this specification may be realized as a method or process, apparatus, software program, data stream or signal, for example. Although the disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device such as a computer, a cellular phone, a portable/personal digital assistant (PDA), and other devices that facilitate communication of information between end users.

Although embodiments of the present disclosure have been described with reference to the accompanying drawings, these embodiments are for illustrative purposes only, and those skilled in the art will appreciate that various modifications and other equivalent embodiments can be made from these embodiments disclosed herein. Thus, the true technical scope of the present disclosure should be defined by the following claims.

What is claimed is:

1. A braking system for a vehicle, the braking system comprising:

a processor; and a memory that stores at least one instruction executed by the processor, wherein the processor compares an outside temperature of the vehicle with a preset reference outside temperature and controls brake fluid of the vehicle to circulate through a hydraulic circuit of the braking system based on the comparison results, so that a temperature difference between a front end and a rear end of the braking system is reduced.

2. The braking system of claim 1, wherein the processor controls the brake fluid of the vehicle to circulate through the hydraulic circuit of the braking system by performing a pumping process that moves a piston of a main master cylinder back and forth to a preset displacement.

3. The braking system of claim 1, wherein the processor controls the brake fluid to circulate through the hydraulic circuit, monitors the temperature difference between the front end and the rear end of the braking system, and counts a number of brake fluid circulations.

4. The braking system of claim 3, wherein the processor terminates brake fluid circulation when the number of brake fluid circulations reaches a preset minimum number of circulations.

5. The braking system of claim 3, wherein the processor terminates brake fluid circulation when the temperature difference between the front end and the rear end of the braking system meets a preset reference value.

6. A braking method for a vehicle, the braking method including:

receiving, by a processor, an outside temperature of the vehicle;

controlling, by the processor, brake fluid of the vehicle to circulate through a hydraulic circuit of a braking system when the outside temperature of the vehicle is a preset reference outside temperature or lower;

receiving, by the processor, a temperature of the braking system; and terminating, by the processor, brake fluid circulation when a number of brake fluid circulations reaches a preset minimum number of circulations or a temperature difference between a front end and a rear end of the braking system meets a preset reference value.

7. The braking method of claim 6, wherein in the controlling, the processor controls the brake fluid of the vehicle to circulate through the hydraulic circuit of the braking system by performing a pumping process that moves a piston of a main master cylinder back and forth to a preset displacement.

8. The braking method of claim 6, wherein in the controlling, the processor controls the brake fluid to circulate through the hydraulic circuit, monitors the temperature difference between the front end and the rear end of the braking system, and counts the number of brake fluid circulations.

9. The braking method of claim 6, wherein in the terminating, the preset minimum number of circulations is calculated based on a pumping discharge amount relative to a total volume of the brake fluid.

10. The braking method of claim 6, wherein in the terminating, the processor adds an additional circulation of the brake fluid when the number of brake fluid circulations does not reach the preset minimum number of circulations or the temperature difference between the front end and the rear end of the braking system does not meet the preset reference value.

* * * * *